United States Patent [19]

Brunnhofer

[11] Patent Number: 5,476,080
[45] Date of Patent: Dec. 19, 1995

[54] CRASH-RESISTANT MOTOR-VEHICLE FUEL-LINE TUBING

[75] Inventor: Erwin Brunnhofer, Fuldabrück, Germany

[73] Assignee: Technoflow Tube-Systems GmbH, Fuldabruck, Germany

[21] Appl. No.: 296,546

[22] Filed: Aug. 26, 1994

[30] Foreign Application Priority Data

Sep. 11, 1993 [DE] Germany .......................... 43 30 855.4

[51] Int. Cl.⁶ .............................. F16L 9/12; B60K 15/01
[52] U.S. Cl. .................... 123/468; 123/198 D; 138/121; 138/137
[58] Field of Search ...................... 123/468, 469, 123/470, 198 DB; 138/28, 118, 137, 121

[56] References Cited

U.S. PATENT DOCUMENTS

| | | | |
|---|---|---|---|
| 3,620,198 | 11/1971 | Breitschwerdt | 123/198 DB |
| 4,718,568 | 1/1988 | Dal Palu | 138/121 |
| 5,076,242 | 12/1991 | Parker | 123/468 |
| 5,125,909 | 6/1992 | Heimberger | 138/121 |
| 5,129,429 | 7/1992 | Winter et al. | 138/121 |
| 5,167,259 | 12/1992 | Brunnhofer | 138/137 |
| 5,168,856 | 12/1992 | Lorraine | 123/468 |
| 5,193,588 | 3/1993 | Kanao | 138/121 |
| 5,219,003 | 6/1993 | Kerschbaumer | 138/137 |
| 5,279,333 | 1/1994 | Lawrence | 138/121 |
| 5,329,899 | 7/1994 | Sawert et al. | 123/468 |

OTHER PUBLICATIONS

DIN 53 455–Aug. 1981; DIN 53 505–Jun. 1987; DIN 73 377–Feb. 1991; DIN 73 378–Dec. 1990; DIN 16 773 Teil 1–Feb. 1985; DIN 16 773 Teil 2–Feb. 1989; DIN 16 774 Teil 1–Dec. 1984; DIN 16 774 Teil 2–Apr. 1988; DIN 16 779 Teil 1–Jan. 1988; DIN 16779 Teil 2–Oct. 1990 Designation: D 1972–91, "Standard Practice for Generic Marking of Plastic Products", 3 pages.

*Primary Examiner*—Thomas N. Moulis
*Attorney, Agent, or Firm*—Herbert Dubno; Andrew Wilford

[57] ABSTRACT

A fuel-line tube formed wholly of plastic has ends provided with fittings connecting it to the engine and tank and capable of resisting disconnection from the tube and tank when stressed at less than a predetermined pullout force. This tube has an outside diameter of less than 15 mm and is formed with a corrugated crash-resistant section of a predetermined length which is a maximum of 50% of a precorrugated length and capable of elongation in response to a crash with a tensile force smaller than the pullout force.

11 Claims, 2 Drawing Sheets

CRASH-RESISTANT MOTOR-VEHICLE FUEL-LINE TUBING

FIELD OF THE INVENTION

The present invention relates to tube used in a motorvehicle fuel system. More particularly this invention concerns such a tube that is crash resistant.

BACKGROUND OF THE INVENTION

A modern motor vehicle typically has three tubes that run from the fuel tank, normally mounted under the rear of the vehicle, to the engine, normally in the front of the vehicle, that is a fuel line, a return line, and a vent line. Each of these tubes conducts fuel, which may be gasoline, diesel, or gas, or vapors of this fuel between the tank and various parts of the engine, the fuel and return lines to the fuel pump and the vent line to the intake manifold. As a rule the tubes are quite small, at most 15 mm in outside diameter.

In view of the highly flammable contents of such tubes, they must meet high crash standards. In a serious accident the tubes should not rupture and the fittings that attach the ends of the tubes to the tank and engine should not pull out. Any failure could release fuel into an accident site where it could pose an enormous danger.

Since the path such tubes must follow is invariably somewhat circuitous, in the oldest systems each tube was formed by a plurality of rigid and normally straight sections joined by flexible rubber hoses. The hoses were situated where the tube had to curve to get around something and also allowed the parts of the tube to move relative to each other, as in a crash, without leakage. The rigid parts, which were made of metal or plastic, could be shaped somewhat if necessary and were normally clamped to the vehicle body.

It has also been suggested to make the tubes wholly of plastic. The problem with this solution is that the fuel can diffuse into and even through many standard resins, so that it is necessary to coextrude an inner layer in the tube of a blocking resin, that is one that the fuel cannot diffuse through. Such a blocking resin is invariably fairly rigid so that the overall tube can bend very little. Thus it is necessary to preshape the tube, normally with heat, for the particular vehicle. Such a tube has little give, however, so that it cannot normally meet modern-day crash standards.

OBJECTS OF THE INVENTION

It is therefore an object of the present invention to provide an improved crash-resistant motor-vehicle fuel-line tube.

Another object is the provision of such an improved crash-resistant motor-vehicle fuel-line tube which overcomes the above-given disadvantages, that is which is highly crash resistant but which is relatively simple and cheap to manufacture.

A further object is to provide such a tube which can be bent to the desired shape by the installer.

SUMMARY OF THE INVENTION

These objects are achieved according to the invention in a fuel-line tube formed wholly of plastic and having ends provided with fittings connecting it to the engine and tank and capable of resisting disconnection from the tube and tank when stressed at less than a predetermined pullout force. This tube has an outside diameter of less than 15 mm and is formed with a corrugated crash-resistant section of a predetermined length which is a maximum of 50% of a precorrugated length and capable of elongation in response to a crash with a tensile force smaller than the pullout force.

Thus in a crash the corrugated section, and there are usually at least two of them in the tube so that they account for a good third of the tube's end-to-end rectified length, can stretch substantially where corrugated before enough tension is applied to the fittings to break the connection at them. The corrugated sections in the tube act as a stretch-absorbing buffer in a crash, permitting the tube to stretch considerably before it will transmit enough force to the fittings to damage them. The tube can be delivered to the assembly plant straight and there bent into the necessary shape, normally by the assembly personnel. This eases shipping and allows the tubes to accommodate minor design changes with ease, so long as the corrugated sections are provided at the locations where the tube needs to bend.

According to another feature of the invention the plastic is such that when filled with a fuel containing 15% methanol the fuel will diffuse into the tube at most 2 g per day and meter at 60° C. and 4 bar in a dynamic diffusion test of an 8×1 tube. Furthermore the corrugated section is such that the integrated diffusion through the section of the tube is at most 30% more than the diffusion through a noncorrugated section of the tube. The tube has a breaking resistance of between about 500N to 1500N and the fittings comply with DIN 73,377 ("DIN" standing for the German National Industrial Standards), so that they have a similar strength to break. The corrugated section is further capable of being stretched to 100% to 250% of its original length without breaking. Thus even after the tube has been stressed enough to pull the corrugations out of its corrugated sections, it can continue to stretch without breaking.

The plastic of the tube, which can be of one or several coextruded layers, can be a nylon selected from the group of PA6, PA66, PA46, PA69, PA610, PA612, PA6-3T, PA11, PA12 as described part 1 of DIN 16,733, the PP or polypropylene group of DIN 16,774, the PET (polyethyleneterephthalate) and PBT (polybutyleneterephthalate) group described in DIN 16,779, the polyester elastomer TEEE group described in ASTM D1972, and the fluoropolymer group containing PVDF (polyvinylidene fluoride), ETFE (ethylenetetrafluorethylene polymer), FEP (tetrafluoroethylene/tetrafluoropropylene polymer), PFE, ECTFE (ethylene/chlorotrifluorethlene polymers), PTFE (polytetrafluoroethylene), or compatible mixtures thereof. The tube can also be unitarily formed of a single layer.

To improve the ruggedness of the tube, in particular its resistance to scratching or spalling when painted, the tube includes an inner layer of a predetermined hardness and thickness and a coextruded outer layer of a hardness equal to at most 80% of the hardness of the inner layer and a thickness equal to at most 50% the thickness of the inner layer. The outer layer is a plastic from the group including PA6, PA66, PA46, PA69, PA610, PA612, PA11, and PA12 described in part 1 of DIN 16,733, from the group including PP described in DIN 16,744, from the flouropolymer group including PVDF, ETFE, FEP, PFA, ECTFE, and PTFE or compatible mixtures thereof. The tube can also be covered in critical areas with an armoring spiral or a mesh, or even an elastomer layer to protect it.

The tube according to the invention can have a wall thickness of between 0.5 mm and 4 mm, preferably about 1 mm.

Furthermore according to the invention the tube has a hardness between Shore D30 and Shore D85 according to DIN 53,505, a tensile strength in the region of 10N/mm² to 60N/mm² according to DIN 53,455, an elongation to break of 100% to 600% according to DIN 53,455, and an impact resistance at −40° C. allowing 10 tests without breaking according to DIN 73,378.

BRIEF DESCRIPTION OF THE DRAWING

The above and other objects, features, and advantages will become more readily apparent from the following description, reference being made to the accompanying drawing in which.

SPECIFIC DESCRIPTION

Figures 1, 2:
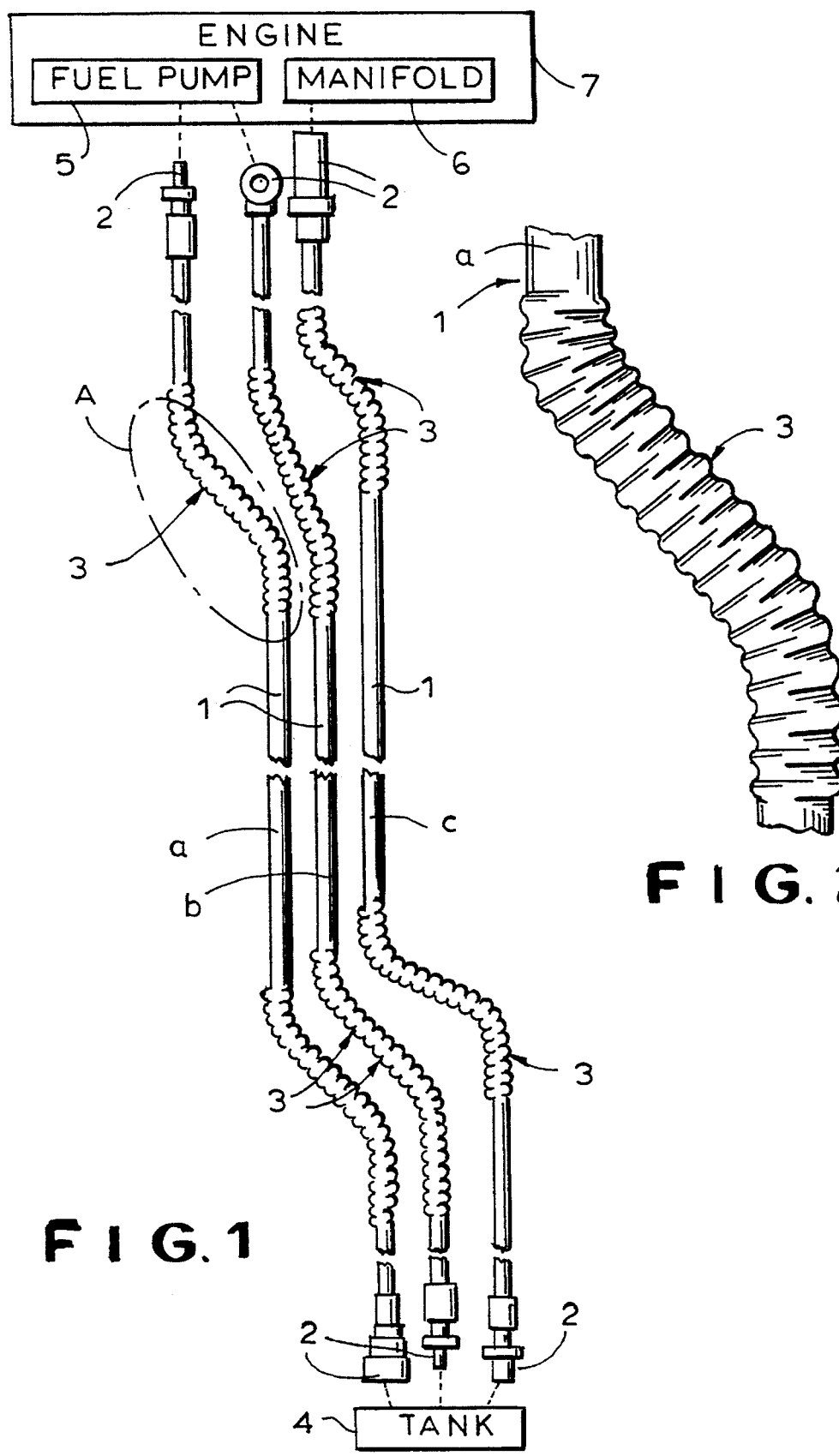
FIG. 1 is a small-scale partly diagrammatic top view of a set of fuel lines according to the invention as indicated at A in FIG. 1.
FIG. 2 is a large-scale view of the detail indicated at II in FIG. 1.
Figure 3:
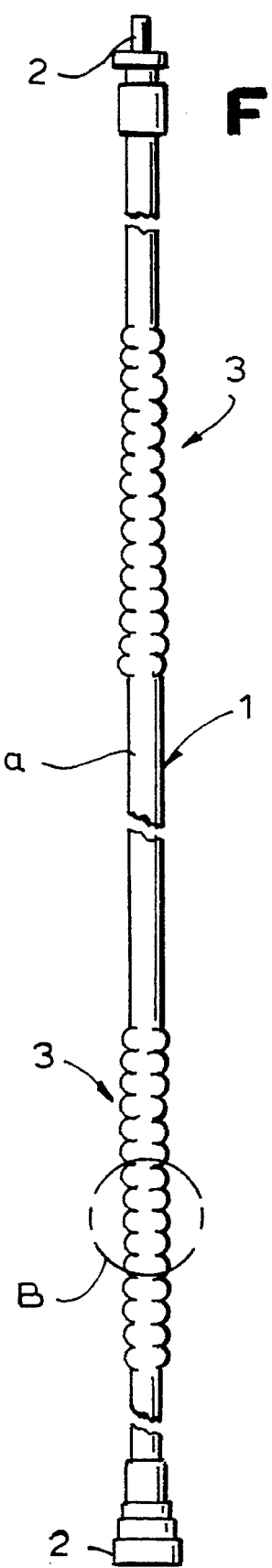
FIG. 3 is a view of one of the fuel-line tubes of FIG. 1 in straightened or rectified condition.

As seen in FIG. 1 three one-piece plastic tubes 1 are provided at their ends with fittings 2 that meet the crash standards of DIN 73,377. These tubes 1 include a fuel-line tube a that conducts fuel from a tank 4 to a fuel pump 5, a return line b that conducts unused fuel from the pump 5 back to the tank 4, and a vent line c that feeds vapors from the tank 4 to an intake manifold 6 of an engine 7 having the pump 5.

Figure 4:
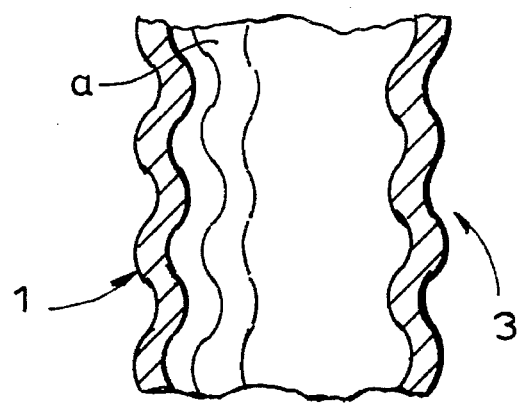
FIG. 4 is a large-scale axial section through the tubing part of FIG. 2 as indicated at B in FIG. 3.

According to the invention as shown in FIGS. 2 and 4 each tube 1 has a corrugated section 3, that is a region of constant wall thickness and with alternate at least partially annular ridges and grooves. The tubes 1 have an outside diameter of less than 15 mm and each section 3 can be stretched straight, eliminating the grooves and bumps, by as much as 50% without breaking. The breaking stress the tubes 1 can withstand is in the region of 500N to 1500N in accordance with DIN 73,377. In fact the overall tube can be stretched from 100% to 250% without breaking.

I claim:

1. In a motor-vehicle having a fuel tank, an engine, and a fuel-line tube connected between the tank and the engine, the improvements wherein:

the tube is formed wholly of plastic;

the tube has ends provided with fittings connecting it to the engine and tank and capable of resisting disconnection from the tube and tank when stressed at less than a predetermined pullout force;

the tube has an outside diameter of less than 15 mm; and the tube has a corrugated crash-resistant section of a predetermined length which is a maximum of 50% of a precorrugated length and capable of elongation in response to a crash with a tensile force smaller than the pullout force.

2. The improvement defined in claim 1 wherein the plastic is such that when filled with a fuel containing 15% methanol the fuel will diffuse into the tube at most 2 g per day and meter at 60° C. and 4 bar in a dynamic diffusion test of an 8 mm inside diameter 1 mm wall thickness tube.

3. The improvement defined in claim 1 wherein the corrugated section is such that the integrated diffusion through the section of the tube is at most 30% more than the diffusion through a noncorrugated section of the tube.

4. The improvement defined in claim 1 wherein the tube has a breaking resistance of between about 500N to 1500N and the fittings comply with DIN 73,377, the corrugated section further being capable of being stretched to 100% to 250% of its original length without breaking.

5. The improvement defined in claim 1 wherein the tube has a plurality of the corrugated sections and straight sections between the corrugated sections, the corrugated sections forming bends.

6. The improvement defined in claim 1 wherein the plastic is PA6, PA66, PA46, PA69, PA610, PA612, PA6-3T, PA11, PA12 as described in part 1 of DIN 16,733, the PP group of DIN 16,774, the PET and PBT group described in DIN 16,779, the polyester elastomer TEEE group described in ASTM D1972, and the fluoropolymer group containing PVDF, ETFE, FEP, PFE, ECTFE, PTFE, or compatible mixtures thereof.

7. The improvement defined in claim 1 wherein the tube is unitarily formed of a single layer.

8. The improvement defined in claim 1 wherein the tube includes:

an inner layer of a predetermined hardness and thickness and a coextruded outer layer of a hardness equal to at most 80% of the hardness of the inner layer and a thickness equal to at most 50% the thickness of the inner layer, the outer layer being a plastic from the group including PA6, PA66, PA46, PA69, PA610, PA612, PA11, and PA12 described in part 1 of DIN 1673, from the group including PP described in DIN 16,744, from the flouropolymer group including PVDF, ETFE, FEP, PFA, ECTFE, and PTFE or compatible mixtures thereof.

9. The improvement defined in claim 1 wherein the tube has a wall thickness of between 0.5 mm and 4 mm.

10. The improvement defined in claim 9 wherein the wall thickness is about 1 mm.

11. The improvement defined in claim 1 wherein the tube has:

a hardness between Shore D30 and Shore D85 according to DIN 53,505, a tensile strength in the region of 10N/mm² to 60N/mm² according to DIN 53,455, a elongation to break of 100% to 600% according to DIN 53,455, and an impact resistance at −40° C. allowing 10 tests without breaking according to DIN 73,378.

* * * * *